United States Patent
Huang et al.

(10) Patent No.: US 9,763,128 B2
(45) Date of Patent: Sep. 12, 2017

(54) MEASUREMENT REPORTING IN D2D COMMUNICATION

(71) Applicant: Intel Corporation, Santa Clara, CA (US)

(72) Inventors: Rui Huang, Beijing (CN); Hong He, Beijing (CN); Honggang Li, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 42 days.

(21) Appl. No.: 14/440,444

(22) PCT Filed: Dec. 3, 2013

(86) PCT No.: PCT/US2013/072891
§ 371 (c)(1),
(2) Date: May 4, 2015

(87) PCT Pub. No.: WO2014/089094
PCT Pub. Date: Jun. 12, 2014

(65) Prior Publication Data
US 2015/0271859 A1    Sep. 24, 2015

Related U.S. Application Data

(60) Provisional application No. 61/732,851, filed on Dec. 3, 2012.

(51) Int. Cl.
*H04W 24/10* (2009.01)
*H04L 25/03* (2006.01)
(Continued)

(52) U.S. Cl.
CPC .......... *H04W 24/10* (2013.01); *H04B 1/3827* (2013.01); *H04B 7/0452* (2013.01);
(Continued)

(58) Field of Classification Search
None
See application file for complete search history.

(56) References Cited

U.S. PATENT DOCUMENTS

2007/0049308 A1* 3/2007 Lindoff ............... H04W 72/048
455/509
2011/0275382 A1 11/2011 Hakola et al.
(Continued)

FOREIGN PATENT DOCUMENTS

KR   WO 2011139091 A2 * 11/2011 ........ H04W 36/0094
WO   WO2012068731 A1    5/2012

OTHER PUBLICATIONS

International Search Report and Written Opinion mailed Mar. 27, 2014 from International Application No. PCT/US2013/072891.
(Continued)

*Primary Examiner* — Faruk Hamza
*Assistant Examiner* — Cassandra Decker
(74) *Attorney, Agent, or Firm* — Schwabe, Williamson & Wyatt, P.C.

(57) ABSTRACT

An apparatus is provided for use in a User Equipment, UE, comprising an input to receive an information element, IE, during a device-to-device, D2D, communication session with another UE, the IE indicating whether or not the UE is to send a measurement report; a processing section to determine based on the indication; and an output to control transmission by the UE, the processing section being arranged to suppress participation in measurement reporting when it is determined that a measurement report is not to be sent. A related apparatus is provided for use in an evolved Node B, eNB, and related methods are also provided.

16 Claims, 10 Drawing Sheets

(51) Int. Cl.
| | |
|---|---|
| H04L 5/00 | (2006.01) |
| H04L 1/18 | (2006.01) |
| H04W 52/02 | (2009.01) |
| H04L 27/00 | (2006.01) |
| H04W 72/12 | (2009.01) |
| H04B 1/3827 | (2015.01) |
| H04W 84/18 | (2009.01) |
| H04W 92/18 | (2009.01) |
| H04W 72/04 | (2009.01) |
| H04W 36/10 | (2009.01) |
| H04W 52/40 | (2009.01) |
| H04W 76/04 | (2009.01) |
| H04J 11/00 | (2006.01) |
| H04W 72/08 | (2009.01) |
| H04W 76/02 | (2009.01) |
| H04L 1/00 | (2006.01) |
| H04W 24/02 | (2009.01) |
| H04L 25/02 | (2006.01) |
| H04B 7/0452 | (2017.01) |
| H04B 7/06 | (2006.01) |
| H04B 7/155 | (2006.01) |
| H04W 84/04 | (2009.01) |

(52) U.S. Cl.
CPC ....... *H04B 7/0617* (2013.01); *H04B 7/15557* (2013.01); *H04J 11/005* (2013.01); *H04J 11/0053* (2013.01); *H04L 1/0003* (2013.01); *H04L 1/0054* (2013.01); *H04L 1/1854* (2013.01); *H04L 1/1867* (2013.01); *H04L 5/0007* (2013.01); *H04L 5/0048* (2013.01); *H04L 5/0053* (2013.01); *H04L 5/0055* (2013.01); *H04L 5/0057* (2013.01); *H04L 5/0058* (2013.01); *H04L 5/0092* (2013.01); *H04L 25/0202* (2013.01); *H04L 25/03305* (2013.01); *H04W 24/02* (2013.01); *H04W 36/10* (2013.01); *H04W 52/0261* (2013.01); *H04W 52/40* (2013.01); *H04W 72/042* (2013.01); *H04W 72/0406* (2013.01); *H04W 72/048* (2013.01); *H04W 72/0486* (2013.01); *H04W 72/08* (2013.01); *H04W 72/082* (2013.01); *H04W 72/12* (2013.01); *H04W 72/121* (2013.01); *H04W 72/1242* (2013.01); *H04W 72/1247* (2013.01); *H04W 76/023* (2013.01); *H04W 76/046* (2013.01); *H04W 76/048* (2013.01); *H04W 84/18* (2013.01); *H04W 92/18* (2013.01); *H04L 27/0008* (2013.01); *H04W 72/1205* (2013.01); *H04W 84/042* (2013.01); *Y02B 60/50* (2013.01)

(56) References Cited

U.S. PATENT DOCUMENTS

| | | | |
|---|---|---|---|
| 2011/0305179 | A1 | 12/2011 | Wang et al. |
| 2012/0044815 | A1 | 2/2012 | Geirhofer et al. |
| 2012/0057527 | A1* | 3/2012 | Ou .................... H04W 36/0094 370/328 |
| 2013/0051274 | A1* | 2/2013 | Jeong ................ H04W 36/0094 370/252 |
| 2013/0322277 | A1* | 12/2013 | Vanganuru ............ H04W 24/08 370/252 |
| 2015/0195865 | A1* | 7/2015 | Lee ................... H04W 36/0061 455/426.1 |
| 2015/0304902 | A1* | 10/2015 | Yu ....................... H04W 36/165 455/436 |

OTHER PUBLICATIONS

LG Electronics Inc., "Reconfiguration of measurements," 3GPP TSG-RAN WG2 #61bis, R2-081481, Mar. 31-Apr. 4, 2008, Shenzhen, China, 7 pages.

* cited by examiner

MEASUREMENT REPORTING IN D2D COMMUNICATION

CROSS REFERENCE TO RELATED APPLICATIONS

The present application is a national phase entry under 35 U.S.C. §371 of International Application No. PCT/US2013/072891, filed Dec. 3, 2013, entitled "MEASUREMENT REPORTING IN D2D COMMUNICATION", which designates the United States of America, which claims priority to U.S. Patent Application No. 61/732,851, filed Dec. 3, 2012, entitled "ADVANCED WIRELESS COMMUNICATION SYSTEMS AND TECHNIQUES." The entire disclosures of which are hereby incorporated by reference in their entireties for all purposes, except for those sections, if any, that are inconsistent with this specification.

BACKGROUND OF THE INVENTION

It is becoming more important to be able to provide telecommunication services to fixed and mobile subscribers as efficiently and inexpensively as possible. Further, the increased use of mobile applications has resulted in much focus on developing wireless systems capable of delivering large amounts of data at high speed.

Development of more efficient and higher bandwidth wireless networks has become increasingly important and addressing issues of how to maximize efficiencies in such networks is ongoing.

Proximity-based applications and services represent a fast growing social and technological trend that may have a major impact on the evolution of cellular wireless/mobile broadband technologies. These services are based on the awareness that two devices or two users are close to each other and, thus, may be able to directly communicate with each other in a device-to-device (D2D) configuration (also known as LTE Direct). Proximity-based applications include social networking, mobile commerce, advertisement, gaming, etc. D2D communication may also be important to public safety first responders, who may be able to use D2D to communicate without overloading a base station or evolved Node B (eNB, also referred to as eNodeB or E-UTRAN Node B). In addition, the use of D2D communication can result in offloading some traffic from a cellular network.

BRIEF DESCRIPTION OF THE DRAWINGS

Aspects, features and advantages of embodiments of the present invention will become apparent from the following description of the invention in reference to the appended drawings in which like numerals denote like elements and in which.

DETAILED DESCRIPTION

The description and the drawings illustrate specific embodiments. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments set forth in the claims encompass all available equivalents of those claims.

Specific details are set forth in order to provide a thorough understanding of the invention. However, it will be understood by those skilled in the art that the present invention may be practiced without these specific details. In other instances, well-known methods, procedures, components, and circuits have not been described in detail so as not to obscure the present invention.

As used herein, the terms "module" or "section" may refer to, be part of, or include an Application Specific Integrated Circuit (ASIC), an electronic circuit, a processor (shared, dedicated, or group) and/or memory (shared, dedicated, or group) that execute one or more software or firmware instructions and/or programs, a combinational logic circuit, and/or other suitable components that provide the described functionality.

Figure 1:
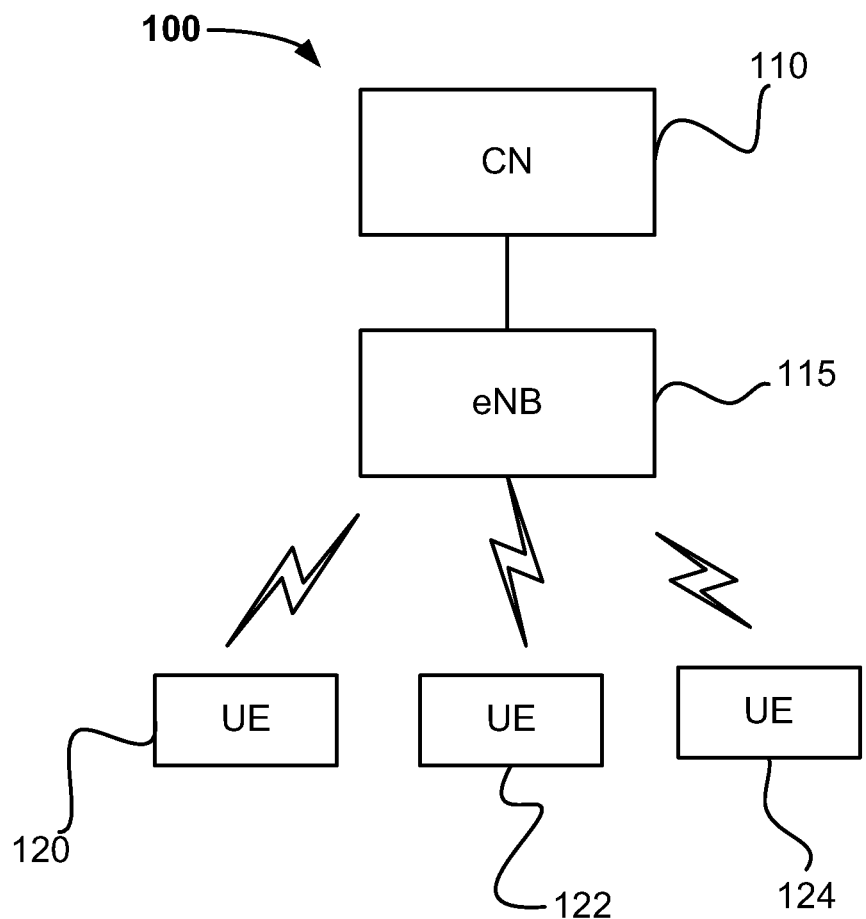
FIG. 1 is block diagram of an example wireless network compatible with various embodiments.

FIG. 1 is a block diagram illustrating a wireless communication network 100 compatible with various embodiments. The wireless communication network 100 may include user equipment (UE) 120-124 and an evolved Node B (eNB) 115. In various embodiments, the eNB 115 may be a fixed station (e.g., a fixed node) or a mobile station/node. eNB 115 is connected to Core network (CN) 110 (also referred to as provider network, PN).

In various embodiments, the UE 120-124 and/or the eNB 115 may include a plurality of antennas to implement a multiple-input-multiple-output (MIMO) transmission system, which may operate in a variety of MIMO modes, including single-user MIMO (SU-MIMO), multi-user MIMO (MU-MIMO), closed loop MIMO, open loop MIMO or variations of smart antenna processing. The UE 120-124 may provide some type of channel state information (CSI) feedback to the eNB 115 via one or more up link channels, and the eNB 115 may adjust one or more down link channels based on the received CSI feedback. The feedback accuracy of the CSI may affect the performance of the MIMO system.

In various embodiments, the uplink channels and the downlink channels may be associated with one or more frequency bands, which may or may not be shared by the uplink channels and the downlink channels. The one or more frequency bands may be further divided into one or more subbands, which may or may not be shared by the uplink and downlink channels. Each frequency subband, one or more aggregated subbands, or the one or more frequency bands for the uplink or downlink channels (wideband) may be referred to as a frequency resource.

In various embodiments, the UE 120 may transmit CSI feedback to the eNB 115. The CSI feedback may include information related to channel quality index (CQI), precoding matrix indicator (PMI), and rank indication (RI). PMI may reference, or otherwise uniquely identify, a precoder within the codebook. The eNB 115 may adjust the downlink channel based on the precoder referenced by the PMI.

UEs may be devices such as smart phones, tablets, e-readers, mobile hotspots, and the like. Traditionally, UEs communicate with other devices via the core network. For example, data may travel from a mobile device through an evolved Node B (eNB) before being routed to its eventual destination. However, in some situations it may be advantageous if devices (i.e. UEs) were able to communicate directly with each other, without the use of an eNB and/or the core network. In an exemplary situation, user equipment, UE1, becomes physically close to user equipment, UE2. A user may wish to transfer files, play a game, or otherwise communicate with UE2 from UE1. The connection between UE1 and UE2 may be automatically initiated by an application, or may be initiated by a user. It may be advantageous, both from the point of view of the underlying network and from the point of view of the devices themselves, for UE1 to communicate directly with UE2. Such a connection has several benefits. For example, less traffic would pass through the eNB, allowing the eNB to service more devices. In addition, because UE1 would be communicating directly with UE2, which is in relative proximity, UE1 and UE2 may be able to use a lower-power mode to make such communications, resulting in power savings and longer battery life. This may also reduce interference from UE1 and UE2 on other nearby UEs and/or eNBs.

Figure 2:
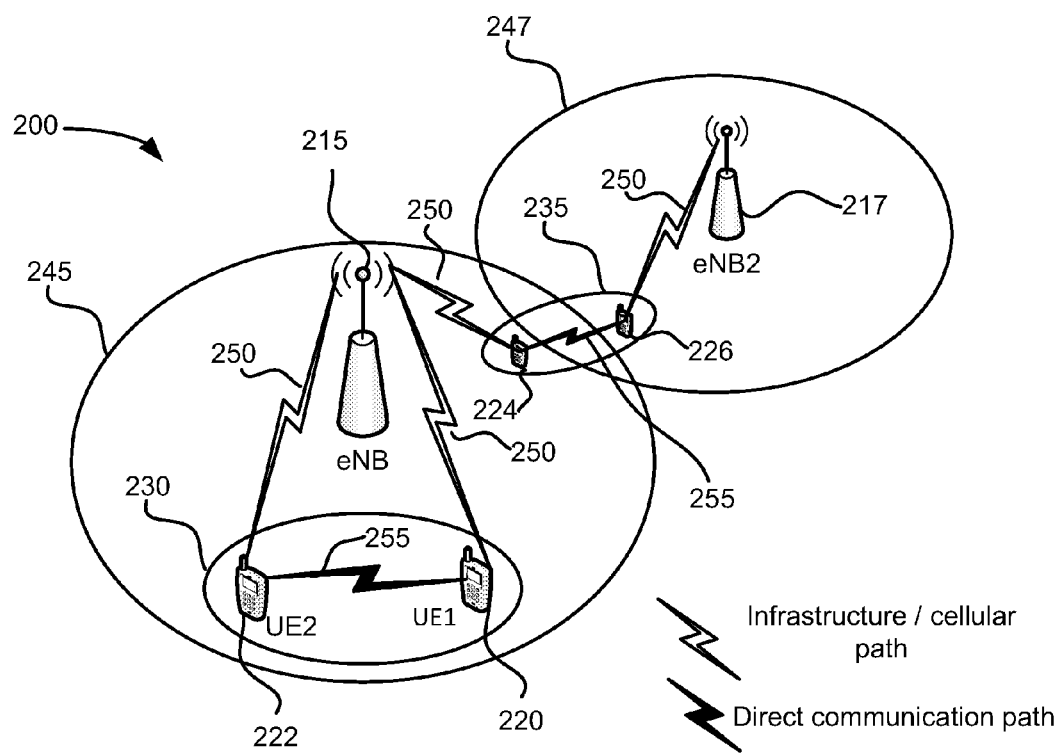
FIG. 2 illustrates a wireless network with device-to-device enabled user equipment according to various embodiments.

FIG. 2 illustrates an exemplary system that combines a Device-to-Device ("D2D") network with a wireless access network, such as an LTE or LTE Advanced network. Mobile broadband network 200 includes an eNB 215. UEs 220, 222 and 224 are within the cell 245 of eNB 215 and communicate with eNB 215 via respective LTE communications channels 250. Also illustrated in FIG. 2 is a further eNB (eNB2) 217, having a cell 247. eNB2 is in communication with UE 226 via communication channel 250.

The notation dUE may be used to denote a D2D enabled UE. However, herein references to a "UE" are intended to relate to a D2D enabled UE, unless the context requires otherwise.

Figure 3:
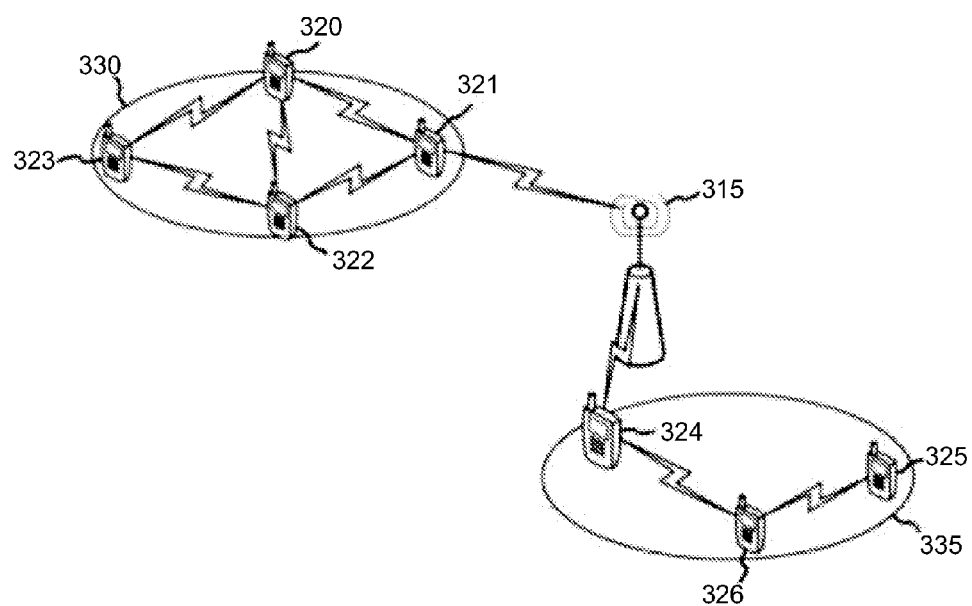
FIG. 3 illustrates a wireless network with device-to-device enabled user equipment according to various embodiments.

FIG. 2 illustrates two D2D clusters 230 and 235. Each one of D2D clusters 230, 235 comprises a plurality of UEs that are capable of communicating directly with each other, without the need to communicate through eNB 215 or eNB2 217. This application may refer to a UE that has D2D capability as a dUE or D2D-UE, to stand for D2D capable User Equipment. As illustrated in cluster 235, the UEs of a cluster may be in communication with different eNBs. Several different layouts of D2D clusters are possible. For example, as illustrated in FIG. 3, a cluster may include more than two UEs. In such clusters, each UE may be in direct communication with one or more than one other UE in the cluster.

Referring to FIG. 3, D2D cluster 330 comprises dUEs 320, 321, 322, and 323 coupled to each other in a mesh configuration, with each of the dUEs 320, 321, 322, and 323 being coupled to each other as illustrated. If a dUE needs to send data to a dUE to which it is not directly coupled (e.g., if dUE 321 is to send data to dUE 323), it can send the data through a dUE to which both of them are connected (e.g., dUE 320). Since the dUEs of cluster 330 are in close proximity to each other, they do not have to transmit data all the way to eNB 315. Accordingly, one or more devices of the cluster may use a lower-power transceiver mode, prolonging the battery life of the dUEs. In addition, because transmissions between the UEs of the cluster are not transmitted via eNB 315, the finite bandwidth capabilities of eNB 315 are not used.

FIG. 3 includes another exemplary cluster 335. Cluster 335 includes UEs 324, 325 and 326. UEs 324 and 325 are D2D connected to each other via UE 326.

In some embodiments, a D2D cluster may include a D2D coordinator. A D2D coordinator is one of the dUEs in the cluster that serves to manage the communications between the dUEs of the cluster and the eNB. In FIG. 3, UE 321 is a D2D coordinator of cluster 330, and UE 324 is a D2D coordinator of cluster 335. In other embodiments, such as that shown in FIG. 2, there is no D2D coordinator, and each UE of a cluster may communicate directly with an eNB. In other embodiments, two or more UEs of a cluster may each communicate directly with an eNB while one or more UEs of the cluster do not communicate directly with an eNB.

It should be understood that other configurations of D2D clusters are also possible. It should also be understood that a single eNB can support many more D2D clusters than are shown in FIGS. 2 and 3.

For the purposes of explanation, the description will focus on a connection between two UEs to be connected via a D2D connection. However, it should be understood that a D2D connection is not limited to two UEs; the principles discussed herein may be extended to support more than two D2D UEs in a D2D communication group (cluster).

A UE may send a measurement report to a serving eNB (that is an eNB that the UE is associated with). The measurement report may include information relating to measured signal quality (e.g. Reference Signal Received Power (RSRP), Reference Signal Received Quality (RSRQ), and/or Received Signal Strength Indicator (RSSI)) associated with signals received from one or more eNBs, such as a serving eNB and one or more neighbor eNBs. This information may be used by a serving eNB to make a cell reselection or handover decision, for example. The measurement report may be sent by the UE in response to a Radio Resource Control, RRC, reconfiguration message received by the UE from an eNB.

Figure 4:
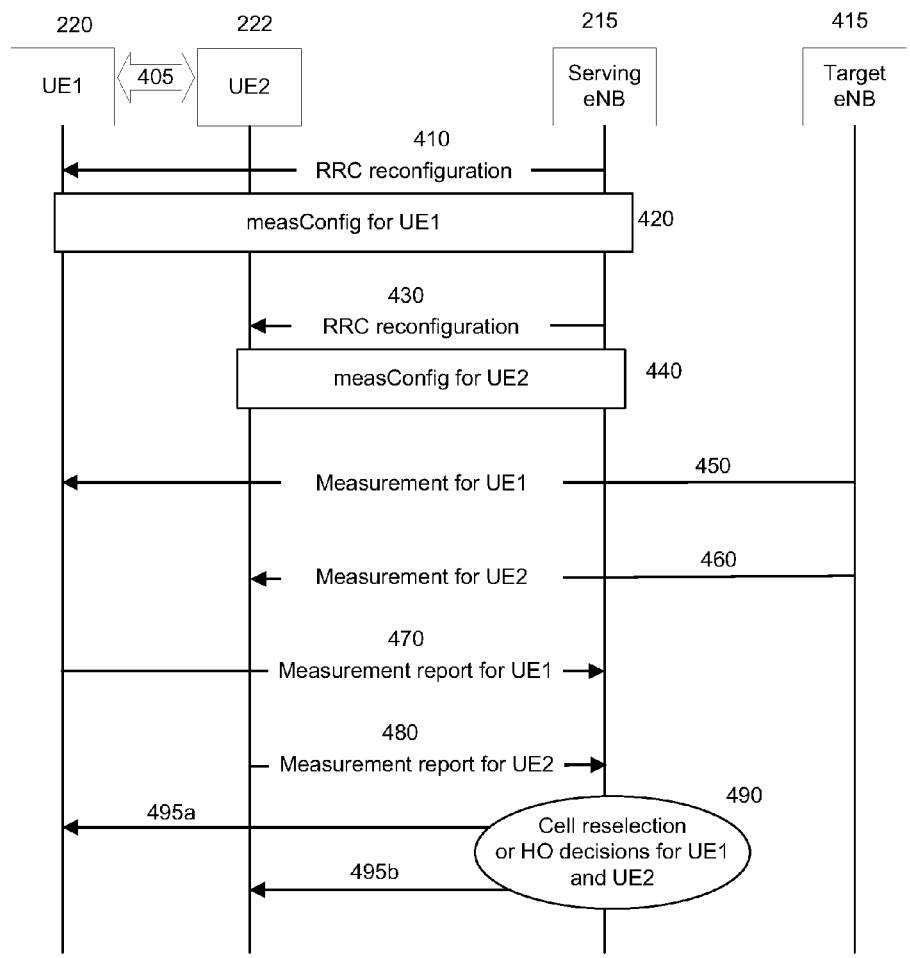
FIG. 4 illustrates signaling performed according to an example.

FIG. 4 illustrates signaling performed according to an exemplary implementation of a measurement reporting process applied to a D2D cluster including UE1 220 and UE2 222, based on extrapolating the signaling for the case in which UE1 220 and UE2 222 are not involved in a D2D communication. UE1 220 and UE2 222 are engaged in a D2D communication session 405, which may include additional UEs.

A serving eNB 215 sends respective RRC reconfiguration messages 410, 430 to each of the first 220 and second 222 UEs, the messages including respective measConfig information elements (IEs) 420 and 440. The RRC reconfiguration messages 410, 430 cause UE1 220 and UE2 222 to receive respective measurement signals 450 and 460 from a target eNB 415. UE1 220 and UE2 222 report on the received measurement signals 450, 460, by sending respective measurement reports 470, 480 to the serving eNB 215. The serving eNB may then, for example, make a cell reselection or handover decisions 490 for UE1 220 and UE2

Figure 5:
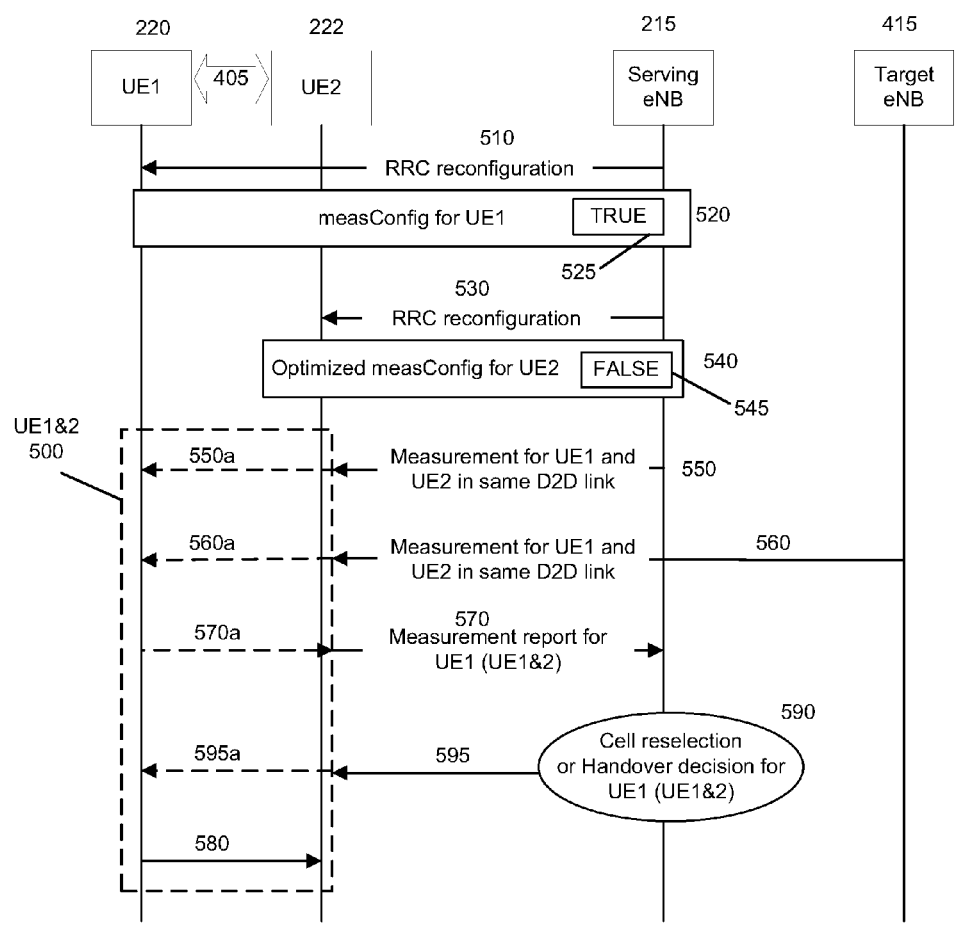
FIG. 5 illustrates signaling performed according to various embodiments.

222, and send the results of decisions 495a, 495b to the respective UEs. FIG. 5 illustrates signaling performed according to an embodiment, in which a measurement reporting process is applied to a D2D cluster including UE1 220 and UE2 222. According to this embodiment, an RRC reconfiguration message 510 is sent to UE1 by serving eNB 215, as described in relation to FIG. 4. However, the RRC reconfiguration message also includes a measurement indicator 525, indicating whether or not the receiving UE is to participate in a measurement reporting procedure.

As in the example of FIG. 4, the RRC reconfiguration message 510 may include a measConfig IE 520. The measConfig IE 520 may include the following elements:

- Measurement objects, defining the object(s) on which the UE shall perform measurements (e.g. a single E-UTRA carrier frequency, a set of cells on a single UTRA carrier, a set of GERAN carrier frequencies, a set of cells on a single (HRPD or 1xRTT) carrier frequency);
- Reporting configuration, defining Reporting criterion that are to trigger a report by the UE and a Reporting format specifying the quantities to include in the measurement report; and/or
- Measurement identities, each linking one measurement object with a reporting configuration; etc.

The above parameters may be as defined in 3GPP standards.

The measConfig IE 520 may also include a MeasurementD2DAnchor element, corresponding to the above-mentioned measurement indicator. This element may be a 1-bit parameter that informs the UE whether or not it is to participate in the measurement reporting process. In the embodiment of FIG. 5, this parameter is "TRUE" in measConfig IE 520 sent to UE1 220, and so UE1 220 is to participate in the measurement reporting.

According to the embodiment of FIG. 5, RRC reconfiguration message 530 also includes a measConfig IE 540. However, the MeasurementD2DAnchor element 545 of this IE 540 has a value of "FALSE", such that UE2 222 is not to participate in the measurement reporting. Other elements (e.g. Measurement objects and other legacy messages) in the measConfig IE 540 may be Null.

In the situation illustrated in FIG. 5, each of serving eNB 215 and a target eNB 415 send respective measurement signals 550, 560 to UE1. The measurement signals may be reference signals for the eNBs. UE1 sends a measurement report 570 to the serving eNB. The measurement report may include RSRP and/or RSRQ, for example. In this embodiment, UE2 does not participate in the measurement reporting process following receipt of the indication from the eNB 215 in the RRC configuration message 530. Based on the measurement report 570, the serving eNB 215 makes a cell reselection or handover decision 590 for both UE1 and UE2, and indicates the result of the decision 595 to UE1, e.g. by Radio Resource Management (RRM) signaling.

The result of the decision is forwarded 580 from UE1 to UE2 via the D2D communication 405.

As illustrated in FIG. 5, the eNBs 215, 415 may be considered, to some extent, to treat UE1 and UE2 as a single unit UE1&2 500 for the purposes of measurement reporting. The measurement communications 550, 560 are sent to UE1 and the measurement report is provided only by UE1. The cell reselection/handover decision 590 may be made by the eNB 215 essentially assuming that UE2 would provide similar or the same measurement results as those provided by UE1. This assumption is likely to be reasonable in the case of UEs involved in the same D2D communication, as it is expected that such UEs are relatively close to each other; for example, the distance between UEs involved in D2D communication may be less than 100 m. This spatial proximity is likely to result in the UEs experiencing similar geometry conditions, interference, etc. The distance between UEs may be determined during a setup of the D2D communication (e.g. to determine whether the UEs are sufficiently close to each other participate in D2D communication), or as part of a periodic or ongoing check performed during the D2D communication. The distance may be estimated based on one or more of measurements of signals between the UEs, GPS data relating to the UEs, etc. In some embodiments the distance is not estimated, but the UEs are determined to be sufficiently close for D2D communication based on measurement of one or more signals between the UEs.

As can be seen from a comparison of FIGS. 4 and 5, the embodiment of FIG. 5 requires less signaling (for example, less signaling is performed by UE2), with the result that power consumption may be significantly reduced, in particular for UE2.

Furthermore, according to the embodiment of FIG. 5, UE2 does not send a measurement report. This may reduce interference when UE1 sends a measurement report 570.

As the signaling is reduced, the usage of network resources (e.g. bandwidth) may be reduced.

In the embodiment of FIG. 5, the cell reselection or handover decision is sent only to UE1, and the decision is forwarded to UE2 via the D2D communication 405.

In FIG. 5 the treatment of UE1 220 and UE2 222 as a single unit UE1&2 500 is illustrated schematically. Signals 550, 560, 570, 595 that are associated with the measurement process for UE1&2 are shown terminating at UE1&2 500. In reality, each of these signals is sent or received by UE1, as illustrated by 550a, 560a, 570a and 595a, which respectively illustrate continuations of signals 550, 560, 570, 595 to/from UE1 220 within the unit 500.

Accordingly, the embodiment of FIG. 5 makes use of the location correlation of devices in a D2D cluster and associated similarity in at least one of RSRP, RSRQ and RSSI, taken jointly and severally in any and all permutations.

Figure 6:
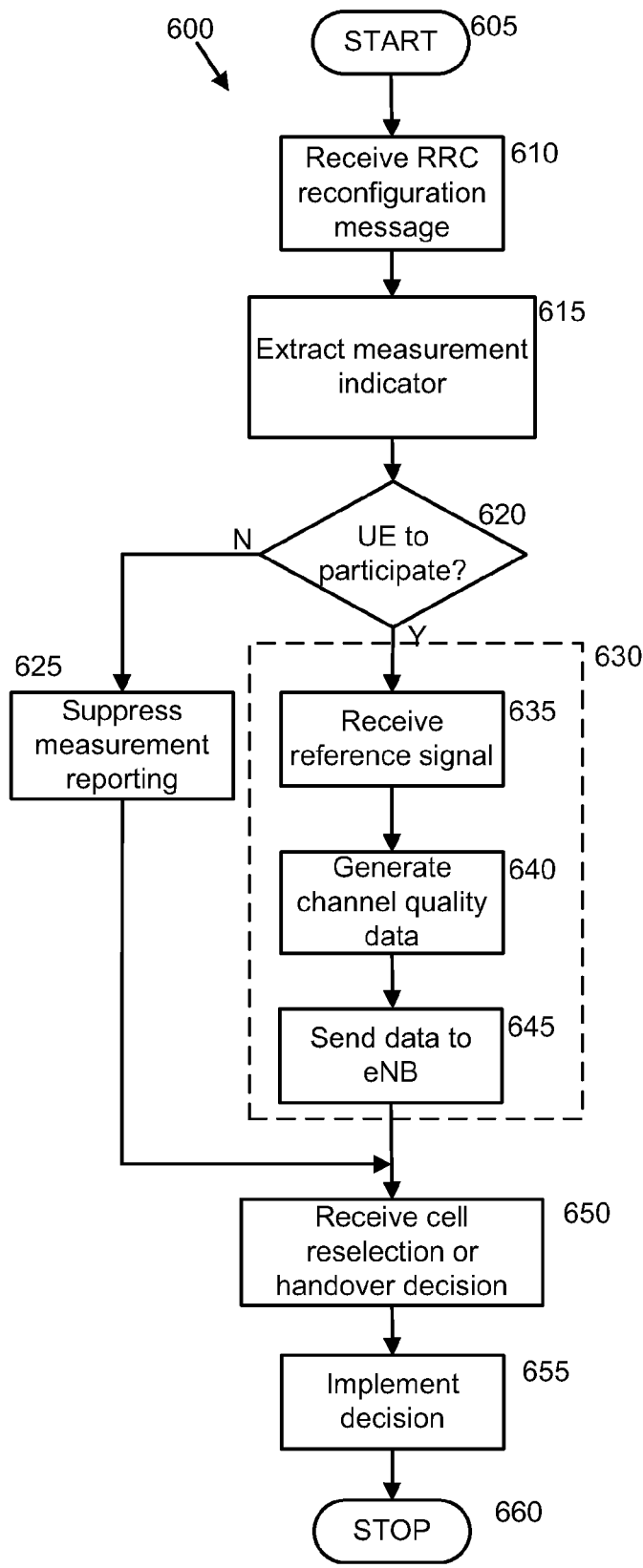
FIG. 6 illustrates a method performed by a User Equipment (or a device within a User Equipment) according to various embodiments.

FIG. 6 illustrates a method 600 performed by a UE according to some embodiments. The method begins at 605, and at 610 the UE 220 receives an RRC reconfiguration message from an eNB 215. The UE 220 extracts, at 615, the measurement indicator from the RRC reconfiguration message and determines at 620 whether the UE 220 is to participate in a measurement reporting process.

If it is determined at 620 that the UE 220 is not to participate in measurement reporting, the method moves to 625 where measurement reporting by the UE 220 is suppressed. The method then moves to 650.

If, at 620, it is determined that the UE 220 is to participate in measurement reporting, measurement reporting is performed at 630. There may be some delay between the determination that the UE is to participate in the measurement reporting and the performance of measurement reporting. For example, measurement reporting may be initiated in response to a predetermined trigger criterion being met, such a criterion may be defined in the RRC reconfiguration message.

The measurement reporting at 630 may include receiving 635 a reference signal from an eNB 215, 415, and generating at 640 channel quality data based on the reference signal received at 635. The channel quality data may then be sent at 645 to an eNB 215, 415. The method may then proceed to 650.

At 650 the UE 220 receives a cell reselection or handover decision from an eNB 215, and at 655 the UE implements the cell reselection or handover decision, and the method terminates at 660.

Figure 7:
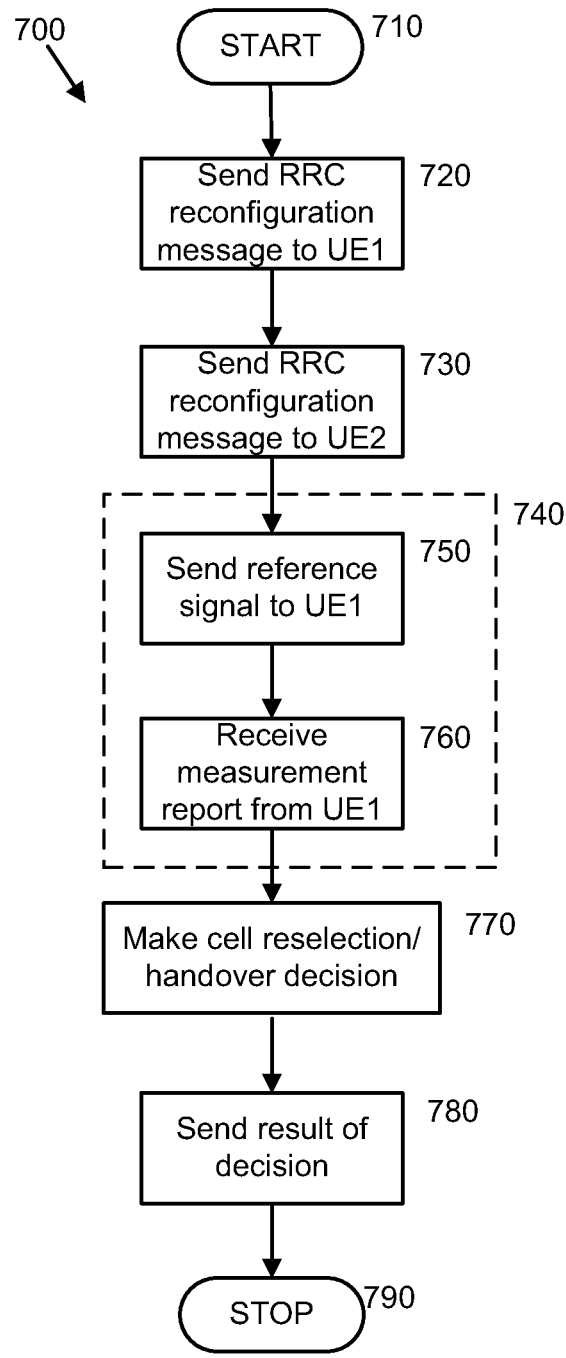
FIG. 7 illustrates a method performed by an evolved Node B (or a device within an evolved Node B) according to various embodiments.

FIG. 7 illustrates a method 700 performed by an eNB 215 according to an embodiment. The method begins at 710 and at 720 the eNB 215 sends an RRC reconfiguration message to a first UE, UE1 220, indicating that UE1 is to participate in a measurement reporting process. At 730, the eNB 215 sends an RRC reconfiguration message to a second UE, UE2 222, indicating that UE2 is not to participate in a measurement reporting process.

At 740 the measurement reporting process is carried out, including sending at 750 a reference signal to UE1 220, and receiving at 760 a measurement report from UE1 220.

A cell reselection or handover decision is made 770 based on the measurement reporting process at 740 (e.g. based on the measurement report received at 760).

A result of the decision making is sent to UE1 220 at 780, and the method terminates at 790.

According to some embodiments, the following procedure may be followed:
1. A network assisted D2D link (e.g. LTE-A D2D) will be established by an eNB, according to D2D discovery criteria (e.g. in which the distance between UEs is less than a predetermined distance. Embodiments can be realized in which the predetermined distance is, for example, 100 m). As the distance between the UEs 200, 222 is small, it is legitimate to assume that their respective channel transfer functions are the same or similar.
2. The serving eNB forwards the measurement configuration messages to one or more UEs in a same D2D cluster (or D2D link):
   a) for a UE, which represents all other members in this D2D link and may be denoted as dUE_cor, the measurement configuration message includes:
      i. MeasurementD2DAnchor: 1 bit (true) to specify the measurement procedure by this UE is to serve as the only measurement procedure for all UEs in this D2D link.
      ii. Measurement objects.
      iii. Reporting configuration.
      iv. Measurement identities.
   Each of ii. To iv. may be as described above, or as defined in 3GPP Rel10/11
   b) For other UEs, which may be denoted dUE_mem and are represented by dUE_cor, the measurement configuration message may include only:
      i. MeasurementD2DAnchor: 1 bit (false) indicating that the measurement procedure is not to be performed by this UE. The mobility management for this UE depends on the measurement of dUE_cor. The corresponding signaling may be forwarded by D2D link.
      ii. Measurement objects and other legacy messages are Null (i.e. take a value of "Null").
3. dUE_cor measures a channel quality (e.g. RSRP and/or RSRQ) of one or more received reference signals from the serving cell and/or neighboring cells.
4. dUE_cor reports measurement results to the serving cell.
5. dUE_mem is connected/associated with (e.g. in D2D communication with) dUE_cor may skip steps 4 and 5, that is, dUE_cor does not measure and report channel quality.
6. eNB of the serving cell will decide, for all UEs in the same D2D link, the cell reselection in the case of an idle state and handover in the case of a connected state.
7. dUE_cor will receive and forward the RRM decision from eNB to other UEs via the D2D link.

In the above embodiment, a single dUE_cor represents all other UEs in the D2D link. However, in some embodiments, more than one dUE_cor may be selected from a D2D link. In such cases, each dUE_cor may participate in the measurement reporting process.

The elements listed in point 2a, above, may be included in measConfig for UE1 520 of FIG. 5. The elements listed in point 2b, above, may be included in measConfig for UE2 540 of FIG. 5.

In some embodiments, the D2D cluster may include more than two UEs. In some cases, only one UE in a cluster will receive an indication that it is to participate in the measurement report process (i.e. operate as UE1 in FIG. 5) and the remaining UEs will receive an indication that they are not to participate in the measurement report process (i.e. operate as UE2 of FIG. 5). In other cases, it may be appropriate for more than one UE of a cluster to participate in the measurement report process, and in such cases, each UE that is to participate receives an indication to that effect from the eNB (e.g. receives a MeasurementD2DAnchor="TRUE" indication), and so each of these UEs would operate as UE1 in FIG. 5. The remaining UE or UEs in the cluster would receive an indication that they are not to participate in the measurement process (e.g. by receiving a MeasurementD2DAnchor="FALSE" indication), and so these UEs would operate as UE2 of FIG. 5.

Put another way, a D2D cluster may include a first set of UEs that receive respective measurement indicators indicating that the UEs in the first set are to participate in a measurement procedure. The cluster may also include a second set of UEs that receive a respective measurement indicator indicating that the UEs of the second set are not to participate in a measurement procedure. The first set of UEs and the second set of UEs may be selected by an eNB or by another network element. The selection may be based on location information (e.g. derived from GPS data associated with the UEs, access points detected by the UEs, or signal strength between the UEs). The selection may associate UEs in the second set with UEs in the first set, such that a cell reselection or handover decision for a particular UE in the first set is also applied to UEs of the second set associated with the particular UE in the first set.

In some embodiments, each UE of the second set may be associated with a UE in the first set to which it is determined to be close, such that the measurement of the UE in the first set is likely to be representative of the associated UE(s) in the second set. In some cases, each UE in the first set may be associated with none, one or a plurality of UEs in the second set. In this way, embodiments may reduce the amount of signaling (and so power and interference) associated with measurement reporting for the cluster, even when some pairs of UEs in the cluster are spatially separated from each other (e.g. where each UE of the cluster is within 100 m of its nearest neighbors, but UEs at opposite edges of the cluster are further apart.

Figure 8:
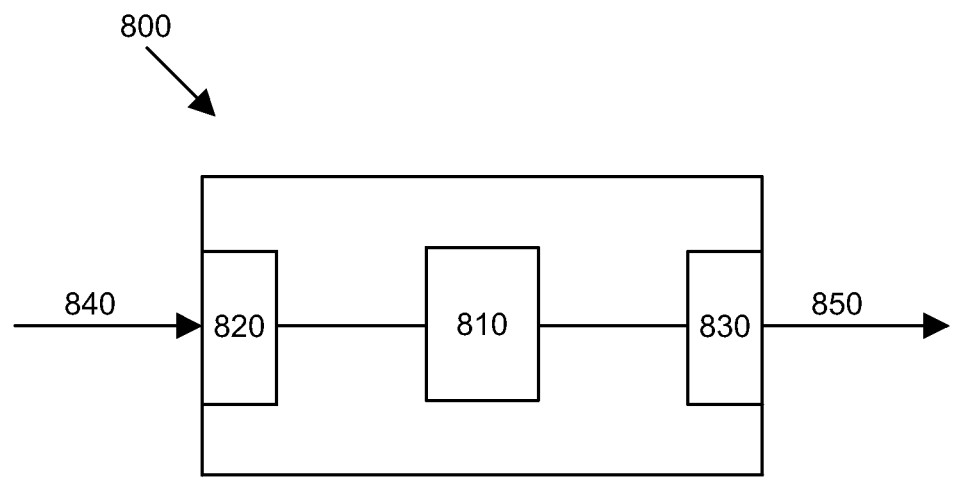
FIG. 8 illustrates an apparatus for use in a User Equipment according to various embodiments.

FIG. 8 illustrates an apparatus 800 for use in a UE 220 according to some embodiments. The apparatus 800 may be implemented in hardware, software or a combination of hardware and software. The apparatus 800 includes an input 820 and an output 830. The input is arranged to receive an information element 840 from a Radio Resource Control, RRC, reconfiguration message directed to the UE 220 while the UE 220 is engaged in a D2D communication session with another UE 222. The received information element 840 including an indication of whether or not the UE 220 is to send a measurement report, e.g. by participating in a measurement reporting procedure.

The apparatus 800 includes a processing section 810 arranged to determine whether or not the UE 220 is to send a measurement report based on the indication included in the information element 840. The output 830 is arranged to output instructions 850 for controlling transmission of data by the UE 220.

The processing section 810 is arranged to suppress participation in measurement reporting when it is determined that the indication included in the information element 840 indicates that the UE 220 is not to send a measurement report.

In some embodiments, where it is determined that the UE 220 is not to send a measurement report, no output instructions 850 are output from output 830.

Figure 9:
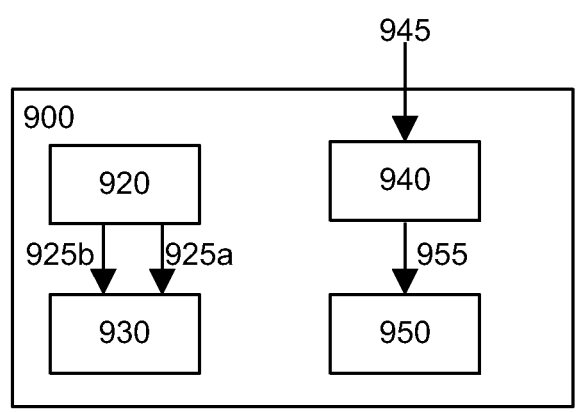
FIG. 9 illustrates an apparatus for use in an evolved Node B according to various embodiments.

FIG. 9 illustrates an apparatus 900 for use in an eNB. The apparatus 900 may be implemented in hardware, software or a combination of hardware and software. The apparatus includes a message generation section 920 to generate a first message 925a for sending to a first UE 220, the first message 925a including an indication that the first UE 220 is to participate in a measurement reporting procedure. The message generation section 920 is also to generate a second message 925b for sending to a second UE 222, the second message 925b including an indication that the second UE 222 is to participate in a measurement reporting procedure. The first 925a and second 925b messages are passed to a sending section 930 that is to cause the first 925a and second 925b messages to be sent to the first 220 and second 222 UEs, respectively.

The apparatus, 900 may also include a receiving section 940 for receiving a measurement report 945 from the first UE 220. The receiving section 940 may extract information 955 from the measurement report 945. The apparatus 900 may also include and a decision section 950 to receive the extracted information 955 from the receiving section 940 and make a cell reselection or handover decision for both the first UE 220 and the second UE 222 based on the extracted information 955. The decision is based on the measurement report 945, since the extracted information 955 is included in the measurement report 945. In some embodiments, the receiving section 940 passes the measurement report 945 to the decision section 950, without extracting information, and the decision is based on the measurement report 945 (e.g. by the decision section extracting information from the measurement report.

The embodiments described herein refer to using a measConfig IE to indicate to a UE whether or not it is to participate in the reporting process. However, other IEs and/or other signaling could be used to perform this indication. The use of the measConfig IE allows a simple implementation in the 3GPP standards. More generally, other measurement signaling in a wireless system could be used to indicate to a UE whether or not it is to participate in the reporting process, instead of the measConfig IE.

In the embodiments described herein, a cell reselection or handover decision is sent by the eNB 215 to UE1 220, and UE1 forwards the decision to UE2 222. However, in some embodiments, the eNB 215 may send the decision directly to each of UE1 220 and UE2 222.

The embodiments described herein refer to cell reselection and handover decisions. More generally, the embodiments may be used to make a mobility management determination.

In various embodiments herein, processing or actions have been described as being performed by an eNB 215. However, it is to be understood that this processing or these actions may, in some cases, be performed by other network elements, such as elements of the core network.

Figure 10:
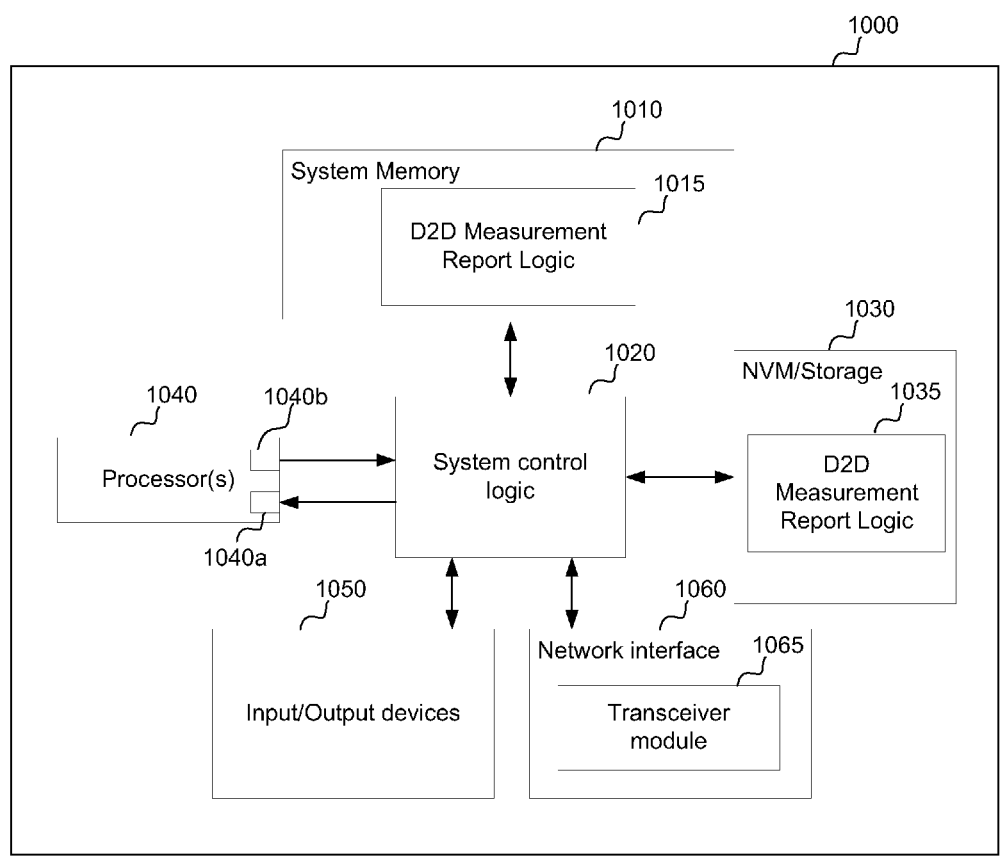
FIG. 10 schematically depicts an example system in accordance with various embodiments.

The eNB 215 and UEs 200, 222 described herein may be implemented using any suitable hardware and/or software. FIG. 10 illustrates an example system 1000 according to some embodiments. System 1000 includes one or more processor(s) 1040, system control logic 1020 coupled with at least one of the processor(s) 1040, system memory 1010 coupled with system control logic 1020, non-volatile memory (NVM)/storage 1030 coupled with system control logic 1020, and a network interface 1060 coupled with system control logic 1020. The system control logic 1020 may also be coupled to Input/Output devices 1050.

Processor(s) 1040 may include one or more single-core or multi-core processors. Processor(s) 1040 may include any combination of general-purpose processors and dedicated processors (e.g., graphics processors, application processors, baseband processors, etc.). Processors 1040 may be operable to carry out the above described methods, using suitable instructions or programs (i.e. operate via use of processor, or other logic, instructions). The instructions may be stored in system memory 1010, as system memory portion (D2D Measurement Report logic) 1015, or additionally or alternatively may be stored in (NVM)/storage 1030, as NVM instruction portion (D2D Measurement Report logic) 1035.

D2D Measurement Report logic 1015 and/or 1035 may include a reporting logic to cause a processor 1040 to determine whether or not to participate in a measurement reporting procedure during an ongoing D2D session, and to suppress measurement reporting when it is determined not to participate in a measurement reporting procedure. D2D Measurement Report logic 1015 and/or 1035 may form part of a communication section, including logic to cause transmission of a measurement report.

D2D Measurement Report logic 1015 and/or 1035 may include logic to cause a processor 1040 to generate a first message to a first UE 220 and generate a second message to a second UE 222, where the first message indicates that the first UE 220 is to participate in a measurement reporting procedure and the second message indicates that the second UE 222 is not to participate in the measurement reporting procedure. D2D Measurement Report logic 1015 and/or 1035 may form part of a communication section, including logic to cause transmission of the first and second messages.

Processors(s) 1040 may be configured to execute the embodiments of FIGS. 5-9 in accordance with various embodiments.

System control logic 1020 for one embodiment may include any suitable interface controllers to provide for any suitable interface to at least one of the processor(s) 1040 and/or to any suitable device or component in communication with system control logic 1020.

System control logic 1020 for one embodiment may include one or more memory controller(s) to provide an interface to system memory 1010. System memory 1010 may be used to load and store data and/or instructions, for example, for system 1000. System memory 1010 for one embodiment may include any suitable volatile memory, such as suitable dynamic random access memory (DRAM), for example.

NVM/storage 1030 may include one or more tangible, non-transitory computer-readable media used to store data and/or instructions, for example. NVM/storage 1030 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 1030 may include a storage resource physically part of a device on which the system 1000 is installed or it may be accessible by, but not necessarily a part of, the device. For example, the NVM/storage 1030 may be accessed over a network via the network interface 1060.

System memory 1010 and NVM/storage 1030 may respectively include, in particular, temporal and persistent copies of, for example, the D2D Measurement Report logic 1015 and 1035, respectively. D2D Measurement Report logic 1015 and 1035 may include instructions that when executed by at least one of the processor(s) 1040 result in the system 1000 implementing a one or more of methods 600 and/or 700, or the method(s) of any other embodiment, as described herein, such as the signaling described above in relation to FIG. 5. In some embodiments, instructions 1015 and 1035, or hardware, firmware, and/or software components thereof, may additionally/alternatively be located in the system control logic 1020, the network interface 1060, and/or the processor(s) 1040.

Network interface 1060 may have a transceiver module 1065 to provide a radio interface for system 1000 to communicate over one or more network(s) (e.g. wireless communication network) and/or with any other suitable device. The transceiver 1065 may perform the various communicating, transmitting and receiving described in the various embodiments, and may include a transmitter section and a receiver section. In various embodiments, the transceiver 1065 may be integrated with other components of system 1000. For example, the transceiver 1065 may include a processor of the processor(s) 1040, memory of the system memory 1010, and NVM/Storage of NVM/Storage 1030. Network interface 1060 may include any suitable hardware and/or firmware. Network interface 1060 may be operatively coupled to a plurality of antennas to provide a multiple input, multiple output radio interface. Network interface 1060 for one embodiment may include, for example, a network adapter, a wireless network adapter, a telephone modem, and/or a wireless modem. For example, where system 1000 is an eNB, network interface 1060 may include an Ethernet interface, an S1-MME interface and/or an S1-U interface.

For one embodiment, at least one of the processor(s) 1040 may be packaged together with logic for one or more controller(s) of system control logic 1020. For one embodiment, at least one of the processor(s) 1040 may be packaged together with logic for one or more controllers of system control logic 1020 to form a System in Package (SiP). For one embodiment, at least one of the processor(s) 1040 may be integrated on the same die with logic for one or more controller(s) of system control logic 1020. For one embodiment, at least one of the processor(s) 1040 may be integrated on the same die with logic for one or more controller(s) of system control logic 1020 to form a System on Chip (SoC). Each of the processors 1040 may include an input 1040a for receiving data and an output 1040b for outputting data.

In various embodiments, the I/O devices 1050 may include user interfaces designed to enable user interaction with the system 1000, peripheral component interfaces designed to enable peripheral component interaction with the system 1000, and/or sensors designed to determine environmental conditions and/or location information related to the system 1000.

Figure 11:
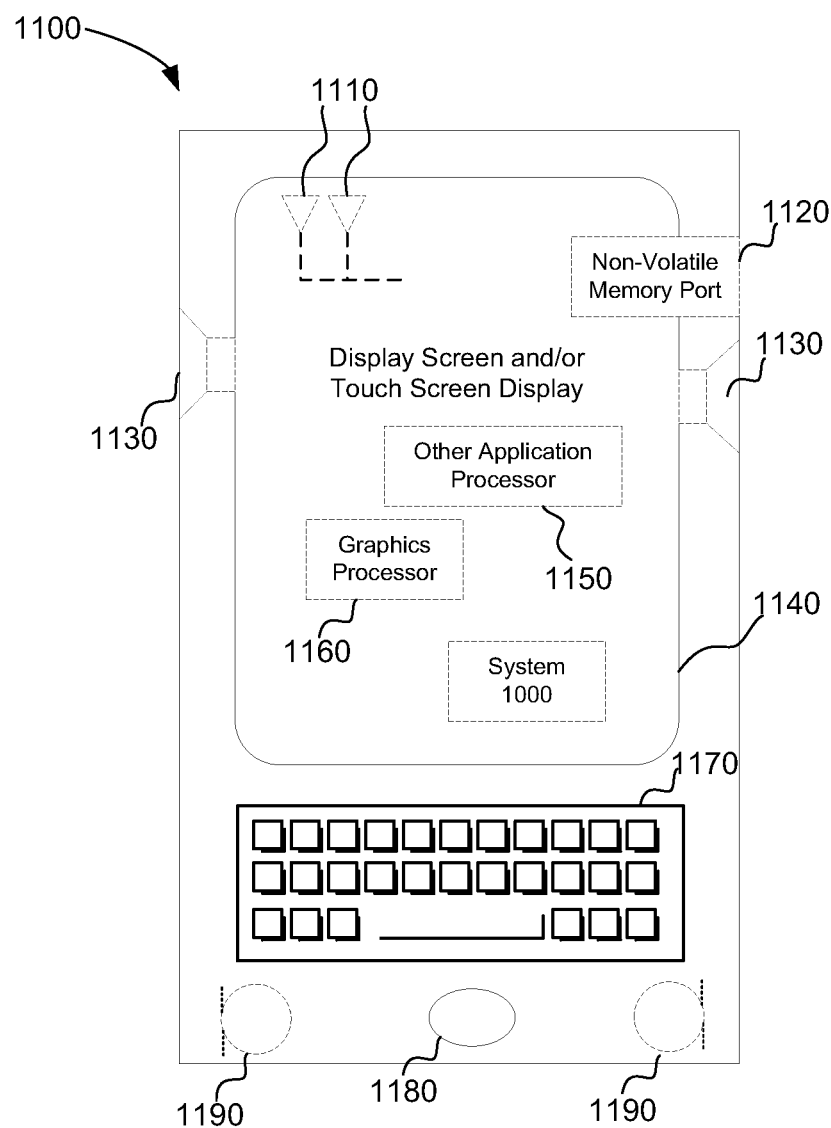
FIG. 11 schematically depicts an example mobile device/User Equipment in accordance with various embodiments.

FIG. 11 shows an embodiment in which the system 1000 implements a UE 220 in the specific form of a mobile device 1100.

In various embodiments, the user interfaces could include, but are not limited to, a display 1140 (e.g., a liquid crystal display, a touch screen display, etc.), a speaker 1130, a microphone 1190, one or more cameras 1180 (e.g., a still camera and/or a video camera), a flashlight (e.g., a light emitting diode flash), and a keyboard 1170.

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 1060 to communicate with components of a positioning network, e.g., a global positioning system (GPS) satellite.

In various embodiments, the system 1100 may be a mobile computing device such as, but not limited to, a laptop computing device, a tablet computing device, a netbook, a mobile phone, etc. In various embodiments, system 1100 may have more or less components, and/or different architectures.

As used herein, "processing circuitry to/configured to/arranged to" perform a function comprises at least one of "hardware configured to", "software configured to" and a "combination of hardware and software configured to" perform that function.

In embodiments, the implemented wireless network may be a 3rd Generation Partnership Project's long term evolution (LTE) advanced wireless communication standard, which may include, but is not limited to releases 8, 9, 10, 11 and 12, or later, of the 3GPP's LTE-A standards.

Although embodiments of the invention are not limited in this regard, the terms "plurality" and "a plurality" as used herein may include, for example, "multiple" or "two or more." The terms "plurality" or "a plurality" may be used herein to describe two or more components, devices, elements, units, parameters, and the like. For example, "a plurality of devices" may include two or more devices.

Where operations are described as multiple discrete operations, this is for the purpose of explaining the illustrative embodiments; however, the order of description should not be construed as to imply that these operations are necessarily order dependent. In particular, these operations need not be performed in the order of presentation.

The terms "comprising," "having," and "including" are synonymous, unless the context dictates otherwise. The phrase "NB" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Unless contrary to physical possibility, the inventors envision the methods described herein: (i) may be performed in any sequence and/or in any combination; and (ii) the components of respective embodiments may be combined in any manner.

Although there have been described example embodiments of this novel invention, many variations and modifications are possible without departing from the scope of the invention. Accordingly the inventive embodiments are not limited by the specific disclosure above, but rather only by the scope of the appended claims and their legal equivalents.

Various embodiments can be realized according to the following clauses:

Clause 1. An apparatus for use in a User Equipment, UE, the apparatus comprising:
an input to receive an information element from a Radio Resource Control, RRC, reconfiguration message directed to the UE during a device-to-device, D2D, communication session with another UE, the information element indicating whether or not the UE is to send a measurement report;
a processing section to determine based on the indication whether or not the UE is to send the measurement report; and
an output to control transmission by the UE, wherein the processing section is arranged to suppress participation in measurement reporting when it is determined that a measurement report is not to be sent.

Clause 2. The apparatus of clause 1, wherein the information element is included in measurement signalling.

Clause 3. The apparatus of clause 1 or clause 2, wherein the information element is a measConfig information element.

Clause 4. The apparatus of any one of clauses 1 to 3, wherein the input is to receive a mobility management decision for the UE as a result of the measurement reporting; and
the processor is to implement the mobility management decision.

Clause 5. The apparatus of any one of clauses 1 to 4, wherein the mobility management decision is at least one of a cell reselection or handover decision for the UE.

Clause 6. The apparatus of clause 4 or clause 5, wherein the mobility management decision is to be received via the D2D communication from the another UE.

Clause 7. The apparatus of any one of clauses 1 to 6, wherein, the processing section is arranged to participate in measurement reporting when it is determined that a measurement report is to be sent, such that
the processing section is to generate data relating to a channel quality of a reference signal received from an evolved Node B, eNB, and
the output is to cause the generated data to be sent to the or another eNB.

Clause 8. The apparatus of any one of clauses 1 to 7, wherein the RRC reconfiguration message uses a Physical Downlink Shared Channel, PDSCH.

Clause 9. A User Equipment, UE, comprising the apparatus of any one of clauses 1 to 8, and further comprising one or more of: a screen, a speaker, a touchscreen, a keyboard, an antenna array including a plurality of antennas, a graphics processor, or an application processor.

Clause 10. A method for cell reselection or handoff during a device-to-device, D2D, communication session, the method comprising:
receiving, by a UE during a D2D communication session, a Radio Resource Control, RRC, reconfiguration message from an evolved Node B, eNB;
extracting, from the RRC reconfiguration message, a measurement indicator; and
based on the measurement indicator, either:
participating in measurement reporting; or
suppressing participation in measurement reporting.

Clause 11. The method of clause 10, wherein the measurement indicator is included in a measConfig information element.

Clause 12. An apparatus for use in an evolved Node B, eNB, the apparatus comprising:
a message generation section to generate a first message to a first User Equipment, UE, of a device-to-device, D2D communication cluster, and to generate a second massage to a second UE of the D2D communication cluster; and
a sending section to cause the first message to be sent to the first UE and to cause the second message to be sent to the second UE, wherein
the first message includes an indicator that the first UE is to participate in a measurement procedure, and
the second message includes an indicator that the second UE is not to participate in the measurement procedure.

Clause 13. The apparatus of clause 12, wherein at least one of the indicator to the first UE and the indicator to the second UE are each in a respective measConfig information element.

Clause 14. The apparatus of clause 12 or clause 13, the apparatus further comprising:
a receiving section to receive a measurement report from the first UE, and
a decision section to make a mobility management decision for both the first UE and the second UE based on the received measurement report from the first UE.

Clause 15. The apparatus of clause 14, wherein the decision section makes the mobility management decision based on the measurement report only from the first UE, and the decision is the same for both the first UE and the second UE.

Clause 16. The apparatus of any one of clauses 12 to 15, wherein the D2D communication cluster includes a single first UE and a plurality of second UEs.

Clause 17. The apparatus of any one of clauses 12 to 15, wherein the D2D communication cluster includes a plurality of first UEs and at least one second UE.

Clause 18. An evolved Node N, eNB, comprising the apparatus of any one of clauses 12 to 17, and further comprising at least one of an S1-MME interface, an S1-U interface, or an Ethernet connection for communication with a core network.

Clause 19. A method for measurement reporting, the method comprising:
sending, by an evolved Node B, eNB, a first Radio Resource Control, RRC, reconfiguration message to a first User Equipment, UE, in a device-to-device, D2D, communication cluster, the first RRC reconfiguration message indicating that the first UE is to perform a measurement procedure;
sending, by the eNB, a second RRC reconfiguration message to a second UE in the D2D communication cluster, the second RRC reconfiguration message indicating that the second UE is not to participate in the measurement procedure; and
performing, by the eNB, a measurement procedure with the first UE.

Clause 20. The method of clause 19, wherein the first RRC reconfiguration message and the second RRC reconfiguration message each include a respective measConfig information element, and
the measConfig information element includes the indication that the first UE is to perform the measurement procedure, and
the measConfig information element includes the indication that the second UE is not to participate in the measurement procedure.

Clause 21. An apparatus for controlling user equipment, UE, measurement reporting, the apparatus comprising:

means to perform device-to-device, D2D, communication with another UE;

means to obtain, during D2D communication, an information element sent by an evolved Node B, eNB, the information element including an indication of whether or not the UE is to participate in measurement reporting; and means to participate or not participate in the measurement reporting, in accordance with the information element.

Clause 22. The apparatus of clause 21, wherein the information element is a measConfig information element.

Clause 23. An apparatus for controlling an evolved Node B, eNB, the apparatus comprising:

means to indicate to a first User Equipment, UE, that is participating in device-to-device, D2D, communication, that the first UE is to participate in a measurement procedure;

means to indicate to a second UE that is participating in D2D communication, that the second UE is not to participate in the measurement procedure; and means to receive a measurement report from the first UE.

Clause 24. The apparatus of clause 23, wherein at least one of the means to indicate to first UE and the means to indicate to the second UE send a measConfig information element to the respective UE.

Clause 25. The apparatus of clause 23 or clause 24, further comprising means to determine a mobility management decision based on the measurement report; and means to inform the first UE of the decision.

Clause 26. A non-transitory storage machine-readable storage medium having stored thereon instructions that, when executed by a computer, cause the computer to perform the method of any one of clauses 10, 11, 19 or 20, or operate as the apparatus of any one of clauses 1 to 9, 12 to 18, or 21 to 25.

Clause 27. A User Equipment, UE, substantially as described herein with reference to the drawings.

Clause 28. An evolved Node B, eNB, substantially as described herein with reference to the drawings.

Clause 29. A method substantially as described herein with reference to the drawings.

The invention claimed is:

1. An apparatus for use in a User Equipment, UE, the apparatus comprising:

an input to receive an information element from a Radio Resource Control, RRC, reconfiguration message directed to the UE during a device-to-device, D2D, communication session with a second UE, the information element including an indicator parameter to indicate the UE is not to perform a measurement procedure and not to send a measurement report, wherein the information element further includes a measurement object that includes a NULL value;

a processor to determine based on the indicator parameter that the UE is not to send the measurement report; and an output to control transmission by the UE, wherein the processor is arranged to suppress participation in measurement reporting by the UE based on the indicator parameter.

2. The apparatus of claim 1, wherein the information element is included in measurement signalling.

3. The apparatus of claim 1, wherein the information element is a measConfig information element.

4. The apparatus of claim 1, wherein the information element is a first information element, the indicator parameter is a first indicator parameter, and the input is to further receive a second information element from another RRC reconfiguration message directed to the UE during another D2D communication session with a third UE, the second information element to include a second indicator parameter to indicate the UE is to send a measurement report; and is to further receive a mobility management decision for the UE as a result of the measurement reporting based on the second indicator parameter; and the processor is to implement the mobility management decision.

5. The apparatus of claim 4, wherein the mobility management decision is at least one of a cell reselection or handover decision for the UE.

6. The apparatus of claim 4, wherein the mobility management decision is to be received via the D2D communication from the third UE.

7. The apparatus of claim 4, wherein, the processor is arranged to participate in the measurement reporting upon a determination based on the second indicator parameter that a measurement report is to be sent, such that the processor is to generate data relating to a channel quality of a reference signal received from an evolved Node B, eNB, and the output is to cause the generated data to be sent to the or another eNB.

8. The apparatus of claim 1, wherein the RRC reconfiguration message uses a Physical Downlink Shared Channel, PDSCH.

9. The apparatus of claim 1, wherein the indicator parameter includes one bit indicating "TRUE" or "FALSE".

10. A User Equipment, UE, comprising the apparatus of claim 1, and further comprising one or more of: a screen, a speaker, a touchscreen, a keyboard, an antenna array including a plurality of antennas, a graphics processor, or an application processor.

11. A method for cell reselection or handoff during a device-to-device, D2D, communication session, the method comprising:

receiving, by a UE during a D2D communication session with another UE, a Radio Resource Control, RRC, reconfiguration message from an evolved Node B, eNB;

extracting, from an information element of the RRC reconfiguration message, a measurement indicator parameter, wherein the measurement indicator parameter is to indicate the UE is not to perform a measurement procedure, and the information element further includes a measurement object that includes a NULL value; and based on the measurement indicator parameter, suppressing participation in measurement reporting.

12. The method of claim 11, wherein the measurement indicator parameter is included in a measConfig information element.

13. The method of claim 11, wherein the measurement indicator parameter includes one bit indicating "TRUE" or "FALSE".

14. A non-transitory machine-readable storage medium having stored thereon instructions that, when executed by a computer, cause the computer to perform cell reselection or handoff during a device-to-device, D2D, communication session, the instructions to cause the computer to:

receive, by a UE during a D2D communication session with another UE, a Radio Resource Control, RRC, reconfiguration message from an evolved Node B, eNB;

extract, from an information element of the RRC reconfiguration message, a measurement indicator parameter, wherein the measurement indicator parameter is to indicate the UE is not to perform a measurement procedure, and the information element further includes a measurement object that includes a NULL value; and based on the measurement indicator parameter, suppress participation in measurement reporting.

15. The medium of claim 14, wherein the measurement indicator parameter is included in measurement signalling.

16. The medium of claim 14, wherein the measurement indicator parameter includes one bit indicating "TRUE" or "FALSE".

\* \* \* \* \*